US 10,735,436 B1

United States Patent
Chernilovsky et al.

(10) Patent No.: US 10,735,436 B1
(45) Date of Patent: Aug. 4, 2020

(54) DYNAMIC DISPLAY CAPTURE TO VERIFY ENCODED VISUAL CODES AND NETWORK ADDRESS INFORMATION

(71) Applicant: CyberArk Software Ltd., Petach-Tikva (IL)

(72) Inventors: Borislav Chernilovsky, Petach-Tikva (IL); Arthur Bendersky, Petach-Tikva (IL)

(73) Assignee: CyberArk Software Ltd., Petach-Tikva (IL)

( * ) Notice: Subject to any disclaimer, the term of this patent is extended or adjusted under 35 U.S.C. 154(b) by 0 days.

(21) Appl. No.: 16/783,034

(22) Filed: Feb. 5, 2020

(51) Int. Cl.
*H04L 29/06* (2006.01)
*H04L 9/32* (2006.01)
*G06K 7/14* (2006.01)

(52) U.S. Cl.
CPC .......... *H04L 63/126* (2013.01); *G06K 7/1417* (2013.01); *H04L 9/3247* (2013.01); *H04L 63/0823* (2013.01)

(58) Field of Classification Search
CPC . H04L 63/126; H04L 63/0823; H04L 9/3247; G06K 7/1417
See application file for complete search history.

(56) References Cited

U.S. PATENT DOCUMENTS

| 9,325,731 | B2* | 4/2016 | McGeehan | G06F 21/55 |
| 9,906,497 | B2* | 2/2018 | Glazemakers | H04L 69/14 |
| 9,978,095 | B2* | 5/2018 | Davis | G06Q 30/0627 |
| 9,985,786 | B1* | 5/2018 | Bhabbur | G09C 5/00 |
| 10,096,122 | B1* | 10/2018 | Agrawal | G06T 7/194 |
| 10,230,705 | B1* | 3/2019 | Joshi | H04L 63/107 |
| 10,467,518 | B1* | 11/2019 | Schweinfurth | G06K 19/07758 |
| 10,552,639 | B1* | 2/2020 | Buzbee | G06F 21/71 |
| 10,601,866 | B2* | 3/2020 | Bartik | H04L 63/1483 |
| 2006/0123464 | A1* | 6/2006 | Goodman | H04L 63/1416 726/2 |
| 2007/0261112 | A1* | 11/2007 | Todd | G06F 21/577 726/11 |
| 2008/0066163 | A1* | 3/2008 | Raheman | H04L 63/0869 726/4 |

(Continued)

OTHER PUBLICATIONS

Robert Lopez Mendez, "The Rise of Depth on Mobile," Graphics and Gaming—Arm Community (Nov. 13, 2018) https://community.arm.com/developer/tools-software/graphics/b/blog/posts/the-rise-of-depth-on-mobile.

(Continued)

*Primary Examiner* — Darren B Schwartz
(74) *Attorney, Agent, or Firm* — Finnegan, Henderson, Farabow, Garrett & Dunner, LLP

(57) ABSTRACT

Disclosed embodiments relate to systems and methods for securely verifying encoded visual codes together with network address information. Techniques include: obtaining a first capture of a visual display, the visual display being generated on a display medium; applying a display detection technique based on the obtained first capture; determining, based on the display detection technique, whether a boundary of the display medium is identified; identifying, within the first capture, an encoded visual representation of a data element and a network address; determining whether the network address is valid; and determining whether to validate the encoded visual representation based on the determination of whether the network address is valid.

19 Claims, 6 Drawing Sheets

(56) References Cited

U.S. PATENT DOCUMENTS

| | | | | |
|---|---|---|---|---|
| 2008/0201464 A1* | 8/2008 | Campbell | ............... | H04L 43/00 709/224 |
| 2008/0319774 A1* | 12/2008 | O'Sullivan | .......... | G06Q 10/101 705/300 |
| 2009/0165136 A1* | 6/2009 | Obrecht | ................ | G06F 21/566 726/24 |
| 2010/0186088 A1* | 7/2010 | Banerjee | ................. | G06F 21/51 726/23 |
| 2012/0079562 A1* | 3/2012 | Anttila | .................... | G06F 21/51 726/3 |
| 2013/0001291 A1* | 1/2013 | Ibrahimbegovic | .... | G06F 21/335 235/375 |
| 2013/0036468 A1* | 2/2013 | Georgiev | ............. | H04L 61/1511 726/23 |
| 2013/0185210 A1* | 7/2013 | Dodson | .................. | H04L 63/08 705/44 |
| 2013/0219479 A1* | 8/2013 | DeSoto | ................ | H04W 12/06 726/6 |
| 2013/0247218 A1* | 9/2013 | Jhingan | ................... | G06F 21/36 726/27 |
| 2013/0263264 A1* | 10/2013 | Klein | ..................... | G06F 21/552 726/23 |
| 2015/0206318 A1* | 7/2015 | Parfenov | ................. | G06T 5/003 382/154 |
| 2015/0227946 A1* | 8/2015 | Huang | ............... | G06Q 30/0185 235/462.25 |
| 2015/0286873 A1* | 10/2015 | Davis | ...................... | G06F 3/013 382/103 |
| 2016/0142439 A1* | 5/2016 | Goutal | ................ | H04L 63/1483 726/22 |
| 2016/0188937 A1* | 6/2016 | Tyrrell | ............. | G01N 33/48771 382/128 |
| 2016/0239976 A1* | 8/2016 | Fathi | ........................ | G06T 7/579 |
| 2017/0041330 A1* | 2/2017 | Hunt | ................... | H04L 63/1416 |
| 2017/0195356 A1* | 7/2017 | Turgeman | ........... | H04L 63/1425 |
| 2018/0115584 A1* | 4/2018 | Alhumaisan | ......... | G06K 9/4652 |
| 2018/0336715 A1* | 11/2018 | Rickwald | ........... | G06K 9/00315 |
| 2019/0068638 A1* | 2/2019 | Bartik | ..................... | H04L 67/02 |
| 2020/0074079 A1* | 3/2020 | Bae | ..................... | H04L 63/1441 |

OTHER PUBLICATIONS

Syed Mohammad Abid Hasan and Kwanghee Ko, *Depth edge detection by image-based smoothing and morphological operations*, 3 J. of Computational Design and Eng. 191-197 (Feb. 17, 2016).

"Time-of-flight camera", VVikipedia (last accessed Jan. 30, 2020).

David Nield, "All the Sensors in Your Smartphone, and How They Work," Gizmodo, pp. 3-4 (Jul. 23, 2017) https://gizmodo.com/all-the-sensors-in-your-smartphone-and-how-they-work-1797121002.

* cited by examiner

DYNAMIC DISPLAY CAPTURE TO VERIFY ENCODED VISUAL CODES AND NETWORK ADDRESS INFORMATION

BACKGROUND

With the increased threat of hacking and phishing attacks to computer systems, there are greater needs for effective and efficient user authentication techniques to prevent malicious users from gaining access to secure resources. Some methods for securing internet resources have been attempted, but these solutions are insufficiently secure, are inefficient, or are vulnerable to phishing attacks.

QR codes and other encoded visual representations permit quick data transfer between mobile devices and other computing devices. Different systems currently use QR codes to transfer data, authenticate users, or identify products. Such QR codes permit mobile devices to interact directly with other computing devices to quickly receive or transfer data. For example, a mobile device can scan a QR code displayed on a screen or other display medium, decode the QR code, and thereby obtain data for authorizing user access to certain restricted locations or systems. QR code authorization systems, however, may be susceptible to phishing attacks in which a malicious user attempts to access a restricted online resource. For example, the malicious user may use phishing techniques to send the QR code to an authorized user, who may scan the code and validate themselves for authorized access to a secure resource, thereby giving the malicious user access to the resource or to the authorized user's data.

Accordingly, in view of these and other deficiencies in existing techniques involving QR codes and access to secure resources, technological solutions are needed for effective, efficient, and secure authorization through encoded visual representations. Solutions should also guard against phishing attacks and other attempts by malicious users to gain access to secure resources. Such systems should authenticate a user only if the QR code or other visual representation originates from a trusted website or other source.

SUMMARY

The disclosed embodiments describe non-transitory computer readable media, systems, and methods for securely verifying encoded visual codes together with network address information. For example, in an exemplary embodiment, there may be a non-transitory computer readable medium including instructions that, when executed by at least one processor, cause the at least one processor to perform operations for securely verifying encoded visual codes together with network address information. The operations may comprise obtaining a first capture of a visual display, the visual display being generated on a display medium; applying a display detection technique based on the obtained first capture; determining, based on the display detection technique, whether a boundary of the display medium is identified; identifying, within the first capture, an encoded visual representation of a data element and a network address; determining whether the network address is valid; and determining whether to validate the encoded visual representation based on the determination of whether the network address is valid.

According to a disclosed embodiment, the operations may further comprise determining, for a second capture, and based on the display detection technique, that the boundary of the display medium is not identified; and determining to not validate the encoded visual representation.

According to a disclosed embodiment, the operations may further comprise determining, for the first capture, and based on the display detection technique, that the network address is not valid; and determining to not validate the encoded visual representation.

According to a disclosed embodiment, the display detection technique may include an optical time-of-flight technique.

According to a disclosed embodiment, the display detection technique may include an optical depth-detection technique.

According to a disclosed embodiment, the display detection technique may include comparing gyroscope-based orientation data with optically-captured orientation data associated with the obtained first capture.

According to a disclosed embodiment, the display detection technique may include a two-dimensional image analysis.

According to a disclosed embodiment, determining whether the network address is valid may include referencing a list of approved network addresses.

According to a disclosed embodiment, the operations may further comprise periodically updating the list of approved network addresses.

According to a disclosed embodiment, determining whether the network address is valid may include verifying a cryptographic signature associated with the network address.

According to another disclosed embodiment, a method may be implemented for securely verifying encoded visual codes together with network address information. The method may comprise obtaining a first capture of a visual display, the visual display being generated on a display medium; applying a display detection technique based on the obtained first capture; determining, based on the display detection technique, whether a boundary of the display medium is identified; identifying, within the first capture, an encoded visual representation of a data element and a network address; determining whether the network address is valid; and determining whether to validate the encoded visual representation based on the determination of whether the network address is valid.

According to a disclosed embodiment, the method may be performed in response to a request by an identity to access a secure computing resource.

According to a disclosed embodiment, the determining whether the network address is valid may include determining whether the network address is associated with the identity.

According to a disclosed embodiment, the determining whether the network address is valid may include sending the network address to an external resource for verification.

According to a disclosed embodiment, the encoded visual representation of the data element may be a bar code.

According to a disclosed embodiment, the data element represented by the encoded visual representation may be an access token for accessing a secure computing resource.

According to a disclosed embodiment, the method may further comprise identifying, within the first capture, a first network address and a second network address.

According to a disclosed embodiment, the method may further comprise determining whether the first network address and the second network address are each valid.

According to a disclosed embodiment, the method may further comprise determining not to validate the encoded visual representation if either the first network address or the second network address is not valid.

According to a disclosed embodiment, the method may further comprise sending a report to a security server when the network address is determined not to be valid.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Figure 1:
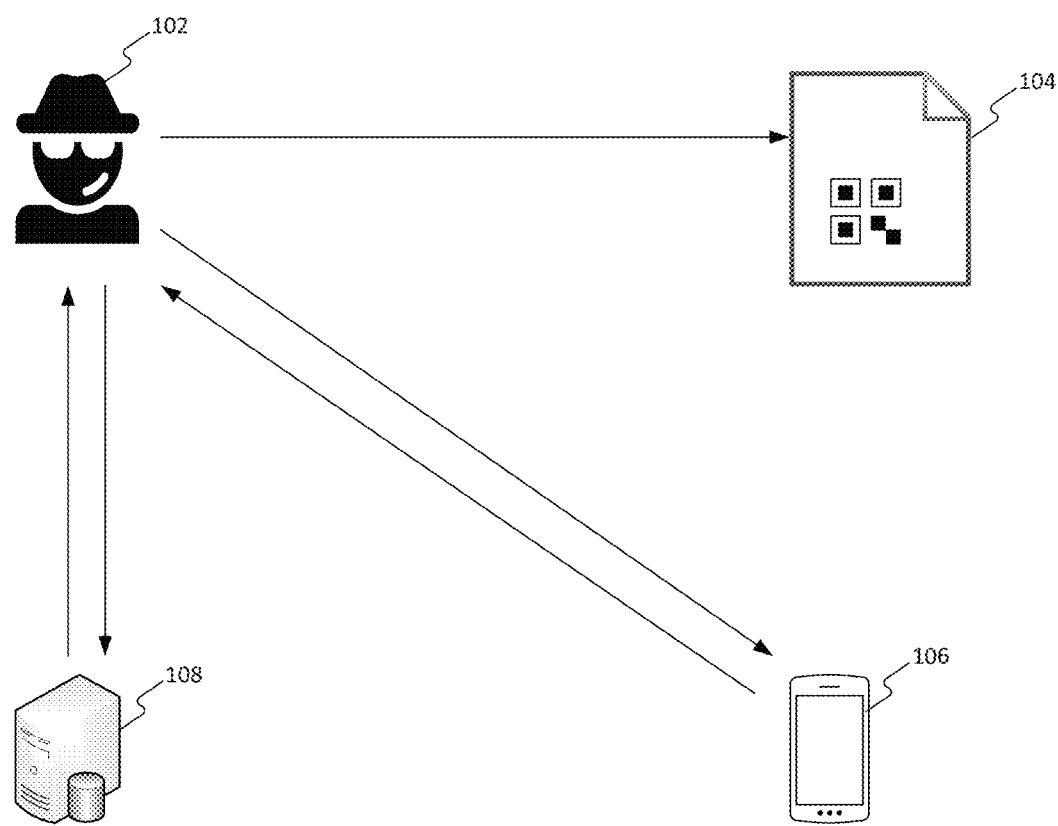
FIG. 1 is a block diagram illustrating a phishing attempt by a malicious actor.

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence, or constrained to a particular system configuration. Additionally, some of the described embodiments or elements thereof can occur or be performed simultaneously, at the same point in time, or concurrently.

The techniques of securely verifying encoded visual codes together with network address information described herein overcome several technological problems relating to security and efficiency of user authorization. As described below, the disclosed embodiments provide techniques for securely verifying encoded visual codes together with network address information. A computing device may receive or identify a request from an identify to access a secure computing resource (e.g., webpage, online application, secure room or physical location, IoT device, etc.). The computing device may then obtain a first capture of a visual display, the visual display being generated on a display medium. The computing device may then apply a display detection technique to the obtained first capture and, based on the display detection technique, the computing device may determine whether a boundary of the display medium is identified in the obtained first capture. The computing device may also identify, within the first capture, an encoded visual representation of a data element and a network address. If the network address is determined to be valid, the computing device may proceed to validate the encoded visual representation. If either the network address or encoded visual representation is invalid, the computing device may deny access to the secure computing resource.

QR code-based authentication is a process where, in order to login to a service, a user needs to scan a QR code with a personal scanning device (such as smartphone, smart watch, tablet, or other scanning device). The scanned code may then be transmitted to an identity provider in order to authenticate the user to a destination service.

For example, a user may request to access a secure computing resource or service by opening a browser and navigating to a login page on a website. In response to the login request, a QR code may be displayed to the user. For example, if the user is interacting with the website on a laptop, the laptop display may show the QR code. In other examples, the QR code may be displayed via an interface at a kiosk, on a monitor, or via another display device. In other examples, the QR code may be presented to the user via printed media, such as a business card, paper, etc.

The user may then scan the QR code with their smartphone or other scanning device. The smartphone may then transmit the code to an identity provider, e.g., the provider or host of the secure resource the user wishes to access. Once the code is validated, authentication succeeds, and the user may be granted access to the website.

However, this method of authentication may be exploited by an attacker. For example, as illustrated in FIG. 1, an attacker can exploit the above authentication method by using a phishing attack to trick the user into authenticating on the attacker's behalf, thereby enabling the attacker to gain full access to the website or to the legitimate user's data.

As shown in FIG. 1, an attacker 102 may initiate a client-side QR session and clone a QR code into a phishing website 104. The attacker may then transmit the phishing page 104 to user 106. For example, the cloned QR code may be sent in a phishing email or other message, prompting the user 106 to scan the cloned QR code.

If the user 106 scans the QR code, for example, using a mobile application targeted by attacker 102, the attacker 102 may gain control of the user's account, e.g., the account associated with the targeted mobile application, or mobile device. Thus, the attacker 102 may interact with application server 108 to retrieve the user's data or perform other malicious activities.

Attempted methods of mitigating a phishing attack have included providing the user with a confirmation message or notification displaying characteristic information about the session made by the client or server. Another solution may be to restrict an authentication process to select networks (e.g., WANs), such as by restricting IP addresses, to minimize the attack window. Other solutions may include location-based restrictions on the authentication process such that authentication processes may only be initiated in a particular geographic location. Finally, some systems may require a sound-based authentication step, which requires additional browser permissions and hardware to implement.

However, none of the above-described methods are capable of reliably and efficiently preventing phishing attacks. Rather, these methods make it harder to implement an attack and lower the attack surface. Disclosed embodiments provide a holistic and robust solution by securely verifying encoded visual codes together with network address information.

Reference will now be made in detail to the disclosed embodiments, examples of which are illustrated in the accompanying drawings.

Figure 2:
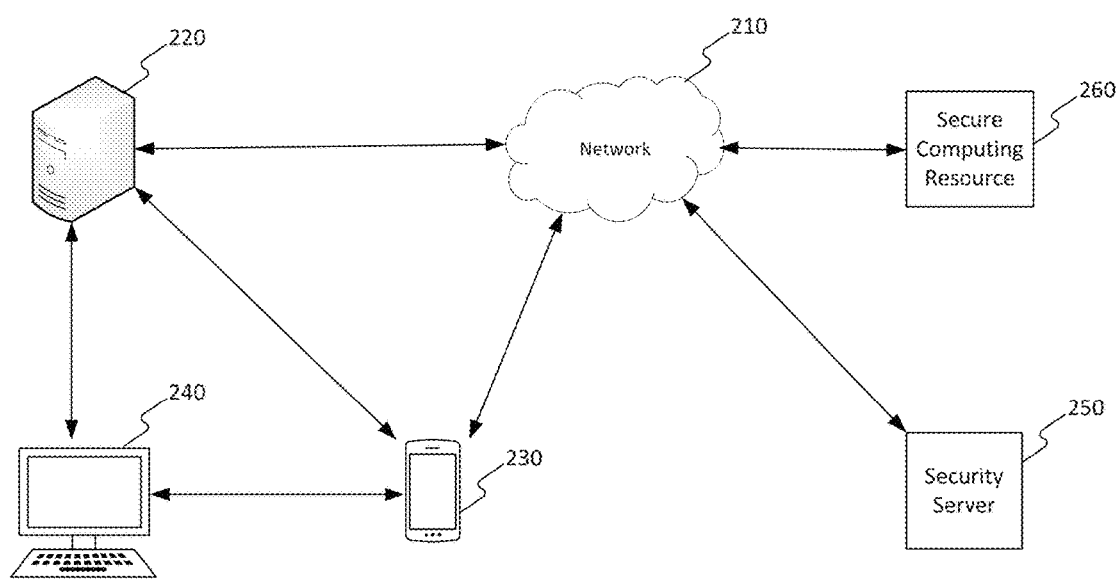
FIG. 2 is a block diagram of an exemplary system for securely verifying encoded visual codes together with network address information in accordance with disclosed embodiments.

FIG. 2 is a block diagram of an exemplary system for securely verifying encoded visual codes together with network address information. System 200 may include a network 210, one or more computing device 220, one or more scanning device 230, one or more display medium 240, one or more security servers 250, and one or more secure computing resources 260, as shown in FIG. 2.

Computing device 220 may be a variety of different types of computing devices, including those capable of communicating over a network or those configured for short-range device-to-device communications. For example, computing device 220 may be a personal computer (e.g., a desktop or laptop), an IoT device (e.g., sensor, smart home appliance, printer, connected vehicle, industrial device, building security device, etc.), a server, a mainframe, a vehicle-based or aircraft-based computer, a virtual machine or virtual container instance, or similar. Computing device 220 may also be a handheld device (e.g., a mobile phone, a tablet, notebook, digital camera, etc.), a wearable device (e.g., a smart watch, smart jewelry, an implantable device, a fitness tracker, smart clothing, a head-mounted display, etc.), ATM, connected kiosk (e.g., a ticketing kiosk, automated checkout, vending machine, roadside toll booth, bikeshare station, etc.), connected physical access point (e.g., a door lock, gate, road barrier, etc.), shared vehicle (e.g., Zipcar™, motorized scooter, bicycle, etc.) or various other devices capable of processing and/or receiving data. Computing device 220 may also be a server or other network-connected computing resource. Additional details regarding computing device 220 are described below in connection with FIG. 3A.

Computing device 220 may be in communication with scanning device 230 (e.g., mobile computing device) and/or display medium 240, as shown in FIG. 2. Computing device 220 may communicate with scanning device 230 directly, for example, through nearfield communications (e.g., Bluetooth, infrared, RFID, light patterns, sound signals, etc.). Alternatively, or in addition, computing device 220 may communicate with scanning device 230 through display medium 240 by presenting a visual code for the scanning device 230 to scan. Alternatively, or in addition, computing device 220 may communicate with scanning device 230 over a network 210. Such communications may take place across various types of networks, such as the Internet, a wired Wide Area Network (WAN), a wired Local Area Network (LAN), a wireless WAN (e.g., WiMAX), a wireless LAN (e.g., IEEE 802.11, etc.), a mesh network, a mobile/cellular network (e.g., 4G, 5G, etc.), an enterprise or private data network, a storage area network, a virtual private network using a public network, a nearfield communications technique (e.g., Bluetooth, infrared, etc.), or various other types of network communications. In some embodiments, the communications may take place across two or more of these forms of networks and protocols.

Scanning device 230 may be any device or component capable of visually or audibly scanning encoded content, such as a machine-readable code or image, light pattern, sound signal, temperature pattern, or other code. For example, scanning device 230 may be a personal computing device, such as a mobile phone, a tablet, a laptop, an e-reading device, a handheld gaming device, a digital camera, a mobile PC, a digital calculator, or the like. Scanning device 230 may also be a wearable device, such as a smart watch, a fitness tracker, smart jewelry or various other wearable devices. In some embodiments, scanning device 230 may be a device with a dedicated scanning functionality, such as a handheld image or document scanner. Scanning device 230 may also be a stationary device, such as a desktop or laptop computer with an auxiliary scanning component in communication with the device. Additional details regarding scanning device 230 are discussed below in connection with FIG. 3B.

In some embodiments, scanning device 230 may be a mobile device with a dedicated application for conducting the user authentication process. The dedicated application may manage the sending of network addresses from the scanning device 230 to computing device 220 or security server 250. The dedicated application may also manage the receipt and transmission of verification tokens and network address data. In some embodiments, the dedicated application may include software for using the mobile device's camera to scan encoded representations. The dedicated application may also provide alerts to the user when access requests are transmitted, network address and/or encoded representation validations fail, etc.

Display medium 240 may be an electronic screen (e.g., LCD screen, LED screen, OLED screen, plasma screen, etc.), a physical printed depiction (e.g. a printed receipt, printed photo, sticker, etc.), lights, or the like. For example, display medium 240 may be a screen on an ATM that is configured to display the encoded code for scanning to permit a user to access the user's financial account. Alternatively, in such an embodiment display medium 240 may be configured to generate a physical (e.g., printed) paper or other material comprising the encoded code. In some embodiments, accordingly, display medium 240 may include a printer to generate printed visual representations on demand.

System 200 may also comprise one or more security servers 250 in communication with network 210. Security server 250 may manage or oversee the various elements of system 200. In some embodiments, security server 250 may be configured to process and manage requests between computing device 220 and scanning device 230. In some embodiments, as described in greater detail below, security server 250 may generate verification tokens used for user authentication. Security server 250 may also manage security threats and access to restricted systems. For example, in response to receiving a security report, security server 250 may deny system access to, or extradite an attack attempt by, an unauthorized device (e.g., unauthorized scanning device 230).

Figure 3A:
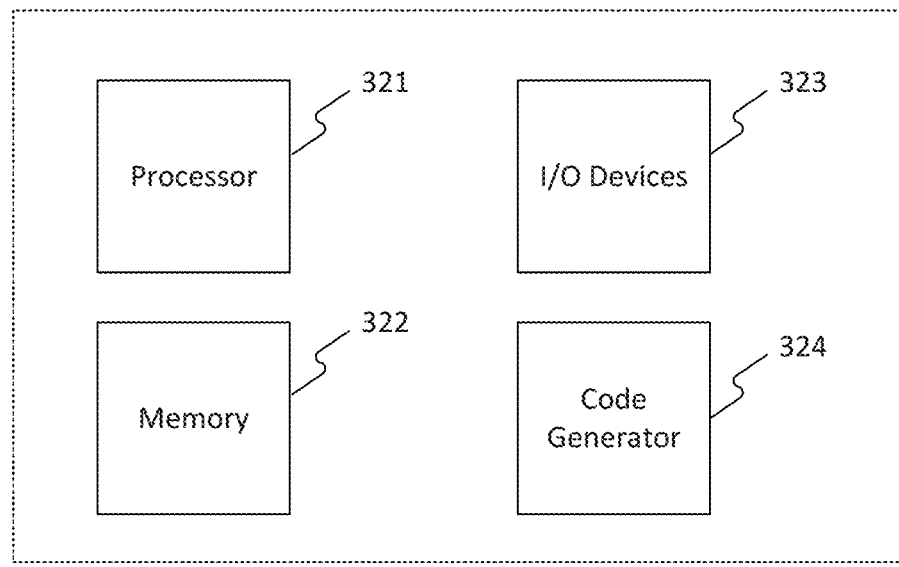
FIG. 3A is a block diagram showing exemplary components of a computing device in accordance with disclosed embodiments.

FIG. 3A is a block diagram showing an exemplary computing device 220 in accordance with disclosed embodiments. Computing device 220 may include one or more processors 321, one or more memories 322, one or more input/output (I/O) devices 323, and one or more code generator components 324. Processor (or processors) 321 may include one or more data or software processing devices. For example, the processor 321 may take the form of, but is not limited to, a microprocessor, embedded processor, or the like, or may be integrated in a system on a chip (SoC). Furthermore, according to some embodiments, the processor 321 may be from the family of processors manufactured by Intel®, AMD®, Qualcomm®, Apple®, NVIDIA®, or the like. The processor 321 may also be based on the ARM architecture, a mobile processor, or a graphics processing unit, etc. The disclosed embodiments are not limited to any type of processor configured in the computing device 220.

Memory (or memories) 322 may include one or more storage devices configured to store instructions used by the processor 321 to perform functions related to the disclosed embodiments. Memory 322 may be configured to store software instructions, such as programs, that perform one or more operations when executed by the processor 321 to perform operations for securely verifying encoded visual codes together with network address information, for example, using method 400, described in detail below. The disclosed embodiments are not limited to particular software programs or devices configured to perform dedicated tasks. For example, the memory 322 may store a single program, such as a user-level application, that performs the functions of the disclosed embodiments, or may comprise multiple software programs. Additionally, the processor 321 may in some embodiments execute one or more programs (or portions thereof) remotely located from the computing device 220. Furthermore, the memory 322 may include one or more storage devices configured to store data for use by the programs.

Input/output devices 323 may include one or more integrated ports, cards, or stand-alone devices configured to allow data to be received and/or transferred by the computing device 220. The I/O devices 323 may include one or more network adaptors or communication devices and/or interfaces (e.g., WiFi, Bluetooth®, RFID, NFC, RF, infrared, etc.) to communicate with other machines and devices, such as with other components of system 200 through network 210. In some embodiments, the I/O devices 323 may comprise a touchscreen configured to allow a user to interact with the computing device 220, and in some embodiments, the I/O devices 323 may comprise a keyboard, mouse, trackball, touch pad, stylus, and the like.

Code generator(s) 324 may allow computing device 220 to generate a scannable code or other encoded representation of data, such as a QR code, a barcode, an encoded image, or another scannable code. In some embodiments, encoded visual representations may take the form of a scannable code. Such scannable code may be a QR code or other bar code format, and thus may conform to various standards or specifications, such as ISO/IEC 18004:2015. In addition to QR codes, other forms of 2D scannable codes may be used, such as a data matrix, Aztec, PDF417, Micro QR, MicroPDF417, CodaBlock-F, MaxiCode, Microsoft Tag, Shotcode, DotCodeetc, PM code, etc. In some embodiments, 1D bar codes or other lower-capacity formats may also be utilized.

In some embodiments, encoded visual representations may vary in color or other pattern. Such codes may be created using a variety of color models, such as RGB, CMY, TSL, etc. In some embodiments, colored codes may be produced by using visual variations other than color (e.g., patterning, shading, etc.). In some embodiments, the encoded visual representation may be a unified code comprising two or more codes, for example, a multi-color QR code comprising two or more single color QR codes. Other color combinations and variations are possible as well.

In some embodiments, the encoded visual representation may be presented as an image. For example, scanning device 230 may use image processing techniques to ascertain data based on the content of the image, or the location of certain elements in the image. Computing system 220 may also be configured to embed data within or on top of an image, for example using a digital watermark, etc. The encoded visual representation may also be a proprietary code or format that may not be readable by other systems or devices. This may provide added security to system 200. Code generator 324 may also generate non-visual forms of encoded representations of data (e.g., sound signal, heat signal, vibration signal, light pattern, etc.).

Code generator 324 may be a separate component of computing device 220, for example, with dedicated processors and/or memories. In other embodiments, though shown separately in FIG. 3A, code generator 324 may be integrated into memory 322 and/or processor 321. For example, code generator 324 may be a software code, a script, or application stored on memory 322 and/or executed by processor 321.

Figure 3B:
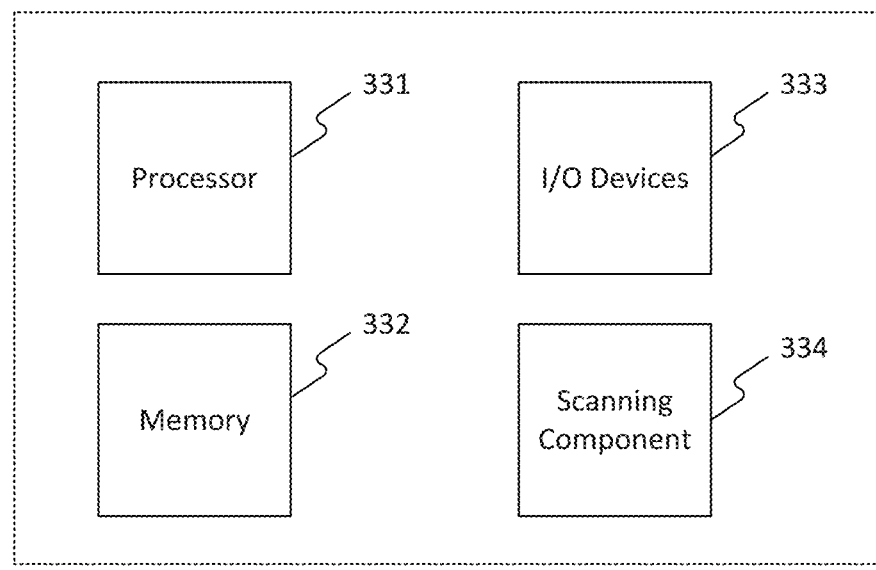
FIG. 3B is a block diagram showing exemplary components of a scanning device in accordance with disclosed embodiments.

FIG. 3B is a block diagram showing an exemplary scanning device 230 in accordance with disclosed embodiments. Scanning device 230 may include one or more processors 331, one or more memories 332, one or more input/output (I/O) devices 333, and one or more scanning components 334. As described above, scanning device 230 may be a mobile device or various other devices capable of scanning an encoded code. Similar to processor 321, as described above, processor 331 may include one or more data or software processing devices. For example, the processor 331 may include, but is not limited to, a microprocessor, embedded processor, or a processor integrated in an SoC.

Memory (or memories) 332 may include one or more storage devices configured to store instructions used by the processor 331 to perform functions related to the disclosed embodiments. The memory 332 may be configured to store software instructions, such as programs, that perform one or more operations when executed by the processor 331 to securely receive data from computing device 220, for example using method 600, described below. Memory 332 may be similar to memory 322 described above. For example, memory 332 may include a single program, such as a user-level application, that performs the functions of the disclosed embodiments, or may comprise multiple software programs.

I/O devices 333 may also be similar to the I/O devices 323 described above for computing system 220. For example, I/O devices 333 may include one or more network adaptors or communication devices and/or interfaces (e.g., WiFi, Bluetooth®, RFID, NFC, RF, infrared, etc.) to communicate with other machines and devices, a touchscreen configured to allow a user to interact with the scanning device 230, a display, a keyboard/keypad, a mouse, a trackball, a touch pad, a stylus, sensors (e.g., gyroscopes, accelerometers, thermometers, cameras, scanners, etc.), and the like.

Scanning component 334 may be configured to capture an image (e.g., a 2D scannable code), a light pattern, a color pattern, a sound signal, a heat signal, or other types of encoded signals. Scanning component 334 may be a hardware component, such as a barcode scanning component, a camera, a time-of-flight (TOF) camera, a document scanner, a microphone, a gyroscope, a thermometer, a pressure sensor, or the like. In some embodiments, scanning component 334 may be an auxiliary component that communicates with scanning device 230 via Bluetooth®, WiFi, USB, etc. Scanning component 334 may have a dedicated processor and/or memory for capturing, storing, and processing the scanned image. In some embodiments, scanning component 334 may describe a software component, such as a code, a script, an application or other form of software, which may be stored on memory 332 and/or executed by processor 331. In such embodiments, scanning component 334 may utilize a camera or scanner included in I/O devices 333 to scan the scannable code.

Figure 4:
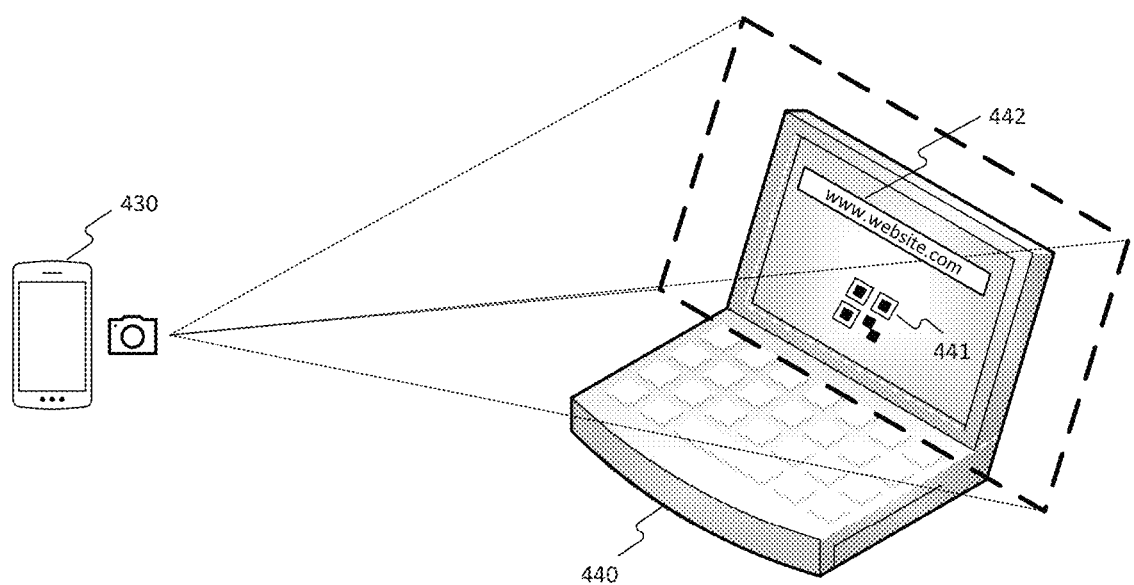
FIG. 4 is an illustration of an exemplary technique for using a scanning device in accordance with disclosed embodiments.

System 200 may be configured to execute an authentication process in which a user is authenticated by securely verifying an encoded visual code together with network address information. Typically, a scanning device may only extract an embedded code, e.g., a barcode or QR code, from a detected or captured image. In disclosed embodiments, as shown in FIG. 4, a scanning device 430 may capture, e.g., via a camera of the device, the display of display medium 440, including the displayed QR code 441 and a displayed network address 442.

In some embodiments, validation of an encoded code (e.g., QR code 441) in a browsing application may be made through validation of a captured image including the encoded code 441 and the associated network address 442, e.g., a URL address. Thus, the validation of the encoded code (e.g., the QR code) is made conditional on a validated network address, thereby validating that the encoded code is originating from a trusted source and not from a phishing website.

By capturing the entire display medium 440 or a complete screen area thereof (e.g., using a smartphone's camera), the combination of the QR Code and the URL bar address may be validated. For example, as shown in FIG. 4, a user may use a smartphone camera, e.g., of scanning device 430, to capture the entire display of a laptop, e.g., of display medium 440. In other embodiments, the user may use a smart device camera to capture a smartphone screen or to capture any other electronic display. For example, display medium 440 may be an interface of a kiosk, such as an ATM or ticketing kiosk.

In some embodiments, if the network address in the address bar does not match the expected legitimate website's network address, the login process will terminate, effectively preventing the attacker from hijacking the authenticated session and accessing the website on victim's behalf.

In some embodiments, upon receiving a login request, the user may be prompted to use scanning device 430 to capture an image of display medium 440. In some embodiments, the user may be prompted to capture a picture of the whole computer monitor in order to identify it as an actual physical object. In other embodiments, the user may be prompted to capture an image of a kiosk screen, device, or smartphone.

Figure 5:
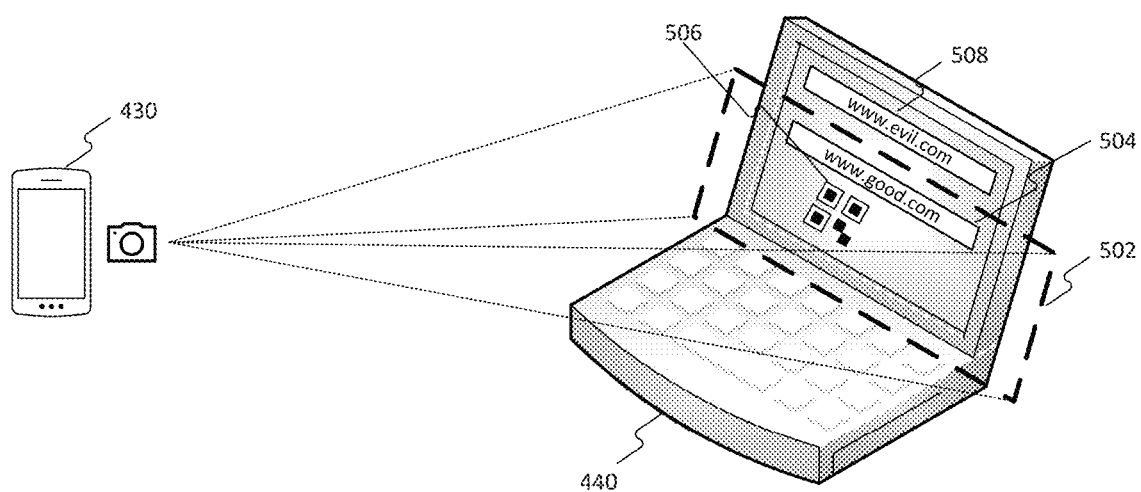
FIG. 5 is an illustration of an attempted phishing attack.

As shown in FIG. 5, if a user only captures some portion 502 of the screen's content, an attacker might be able to position the QR Code and the URL bar in a way that will enable a successful phishing attack. For example, an attacker may generate a landing page displaying a static network address 504 and a cloned QR code 506. The captured portion 502 may include the cloned QR code 506 and fake network address 504, but may not capture the network address of the phishing website 508. Because this may result in a false verification, the system as described herein may require the user to capture an image containing the entirety of the screen of the display medium 440.

In some embodiments, if only a portion 502 of the screen of display medium 440 is captured by scanning device 430, the system may not be able to verify the uncaptured portion of the screen. The system may, for example, deny the user's authentication request. In other embodiments, if the entirety of the screen is not detected in the captured image, the user may be prompted to capture a second image. In some embodiments, the user may be required to capture the second image within a predetermined period of time, e.g., 30 seconds, 1 minute, etc. If the user is unable to complete the request within the threshold period of time, the user may be prompted to authenticate with the system through a different method or may be denied access.

In some embodiments, if the scanning device 430 captures the entire display, the system may identify a first network address, e.g., URL 504, and a second network address, e.g., URL 508. In such an example, the system may determine the validity of both network addresses. If either the first network address or the second network address is not valid, the system may determine not to validate the QR code displayed by display medium 440.

In some embodiments, the system may detect the screen, or other interface, of display medium 440, using mobile device sensors. For example, scanning device 430 may include a time-of-flight (TOF) camera to collect environment depth data and perform depth-edge-detection (DED) of a screen of display medium 440. A TOF technique may, for example, consider the time difference between when a signal is transmitted and when it is returned to a sensor (e.g., using scanning component 334 of scanning device 230). Based on this elapsed time, the distance to an object may be determined. Further, when TOF techniques are used together with edge-detection techniques, it may be reliably determined whether scanning device 430 is observing the entirety of a display screen (e.g., display medium 440).

In some embodiments, to further prevent a malicious attacker from executing a phishing scam, the system may receive orientation data, e.g., from a mobile gyroscope sensor of the scanning device 430, to detect the mobile device orientation. The received orientation data may be matched to the orientation of the screen detected in a 2D of image.

As an example, in some embodiments, a mobile application running on scanning device 430 may detect the device's orientation and simultaneously take a picture of a screen of display medium 440 with a camera of the device. The mobile application, or a remote server, may perform one or more image processing techniques to analyze the captured image and to detect the screen edges and orientation of the screen. The mobile application, or remote server, may then verify that the orientation of the detected edges of the screen matches the orientation received from the gyro sensor of scanning device 430.

Further image processing techniques may be used to identify an address bar displayed via display medium 440 and to detect a network address displayed in the address bar. Image processing techniques may include, but are not limited to, edge-detection and optical character recognition techniques. The mobile application running on the scanning device, or the server, may verify the detected network address 442 within the captured 2D image by matching the text of the network address to a static URL or to a URL included in a whitelist of URLs. System 200 may further include one or more databases (not shown) configured to store whitelisted network addresses. In other embodiments, a database may store blacklisted URLs. If a blacklisted or unknown URL is detected in an image captured by the user, the system may deny the user's authentication request. In other embodiments, if a blacklisted URL is detected, scanning device 430 may display a prompt to the user to alert the user that the webpage they are accessing is a known scam. In another embodiment, instances of blacklisted URLs may be recorded by the system for future security audits.

The mobile application, or server, may dynamically and periodically access a remote resource, e.g., remote database, to receive a list of trusted URLs and/or blacklisted URLs.

In some embodiments, before the QR code generation by computing device 220, a trusted URL or list of URLs may be encrypted (e.g., using the security server 250's private key) and embedded into the QR code. A dedicated mobile application installed on the scanning device 430 may decode the QR code and decrypt the list of trusted URLs using the a public key (e.g., corresponding to the private key of security server 250) that was previously coded into the mobile application or dynamically received, e.g., over network 210.

The mobile application may verify that the detected URL within the previously captured 2D image exists within the URL list and is therefore a valid and safe URL. When both the QR code and the network address, or URL, are verified, security server 250 may then authenticate the user, i.e., the requesting identity.

Figure 6:
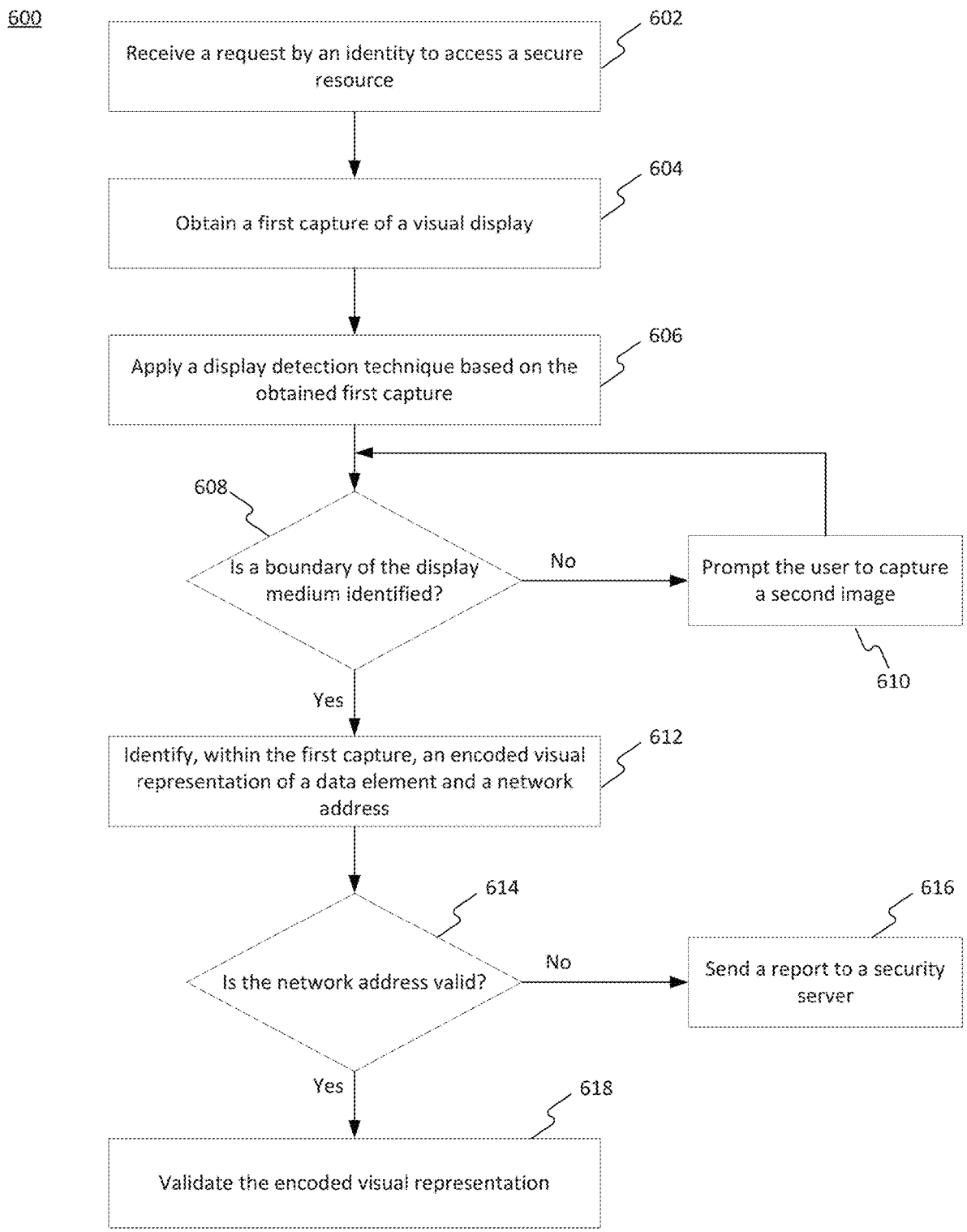
FIG. 6 is a flowchart depicting an exemplary process for a computing device to securely verify encoded visual codes together with network address information in accordance with disclosed embodiments.

FIG. 6 is a block diagram depicting an exemplary process 600 for secure authentication of a user or other identity in accordance with disclosed embodiments. Consistent with the discussion above, process 600 may be implemented, for example, by scanning device 230, computing device 220, or security server 250.

Process 600 may be triggered in response to a computing device 220 receiving or identifying a request by an identity to access a secure resource (step 602). For example, this may occur when a user of scanning device 230 attempts to access a secure network resource 260 (e.g., secure computer, application, website, physical location, IoT device, connected vehicle, etc.). In some embodiments, computing device 220 may receive an access request from security server 250 or another device communicating with network 210 (e.g., a user's personal computer) in response to a user's attempt to access secure network resource 260 or another restricted location. As another example, process 600 may commence when a user of scanning device 230 attempts to access a personal computing device, an operating system, an application, etc. Various other scenarios may trigger a need for computing device 220 to authenticate a user of scanning device 230, and hence may prompt the access request.

In response to the access request, computing device 220 may make an encoded representation of a data element (e.g., a QR code) available for decoding, for example by causing the encoded representation to be visually displayed on display medium 240. For example, the encoded representation may be displayed on an electronic screen or printed onto a paper made available to the user. In some embodiments, the encoded representation may be made available by transmitting a non-visual signal (e.g., sound signal, heat signal, vibration signal, etc.) to scanning device 230.

Simultaneously or in tandem, the computing device 220 may prompt the user to capture, using scanning device 230, the QR code or other encoded representation displayed by display medium 240. The prompt may be displayed, for example, on an interface of the scanning device 230 or the screen or interface of display medium 240. The user may complete this request by causing scanning device 230 to capture an image of the display medium 240. Alternatively, in some embodiments the user may obtain a screen "capture" on their scanning device 230 (e.g., pressing and holding two buttons simultaneously may cause the scanning device 230 to capture an image of its current display screen contents). Further, in some embodiments additional identifying data may be captured in the image obtained by scanning device (e.g., a logo or brand name appearing on display medium 240), which may then be used in the verification process discussed below.

The image captured by scanning device 230 may be obtained by computing device 220 (step 604). For example, computing device 220 and scanning device 230 may communicate via network 210. In other embodiments, computing device 220 and scanning device 230 may be components of a single device.

Computing device 220 may then apply a display detection technique based on the obtained first capture (step 606). For example, computing device 220 may execute one or more image processing techniques to identify boundaries of the screen of display medium 240.

Based on the image analysis, computing device 220 may identify a boundary of the display (step 608). For a rectangular display, computing device 220 may verify four edges of the screen forming a closed rectangle. For other screen configurations, computing device 220 may be configured to verify a continuous boundary around the screen, e.g., a closed circle or closed polygon.

In some embodiments, the display detection technique may include comparing gyroscope-based orientation data with optically-captured orientation data associated with the obtained first capture. The display detection technique may include an optical TOF technique, an optical depth-detection technique, and/or two-dimensional image analysis.

If a bounded screen is not identified, e.g., a rectangular screen where only three boundaries are identified in the captured image, computing device 220 may prompt the user to capture a second image of the display medium 240 (step 610). In another embodiment, computing device 220 may deny the authentication request or prompt the user to authenticate using a different method.

In some embodiments, the user may cause scanning device 230 to capture a second image of display medium 240. Computing device 220 may determine, for the second capture, and based on the display detection technique, that the boundary of the display medium is not identified and determine to not validate the encoded visual representation. For example, computing device 220 may receive orientation information from a gyroscope of scanning device 230 and compare that with the second image data to determine whether the orientation of detected edges matches an expected orientation based on the orientation of the scanning device 230.

If the boundary of the display medium 240 is identified, computing device 220 may identify, within the first captured image, an encoded visual representation of a data element (e.g., a QR code) and a network address (e.g., a URL) (step 612). Alternatively, or in addition to a network address, in some embodiments the verification may also look for a particular logo or brand name, a watermark, or another unique visual identifier on display medium 240.

Computing device 220 may then determine if the network address is valid (step 614). For example, computing device 220 may be configured to store a dynamic list of valid URLs. The list of approved URLs may be periodically updated. In other embodiments, computing device 220 may query a remote database storing approved network addresses or may transmit the network address to security server 250 for verification. In another embodiment, determining whether the network address is valid may include verifying a cryptographic signature associated with the network address. Computing device 220 may also determine whether the network address is associated with the identity, e.g., an identity of the user.

If the network address is not valid, computing device 220 may generate and send a report to security server 250 (step 616). In other embodiments, computing device 220 may generate an alert to be displayed or otherwise provided to the user, alerting the user that they have visited a phishing website. Security server 250 may store unvalidated URLs for further security analysis or to store as blacklisted URLs.

In other embodiments, computing device 220 may determine, for the first capture, and based on the detection technique, that the network address is not valid and determine not to validate the encoded representation.

If the network address is valid, computing device 220 may proceed to validate the encoded visual representation, e.g., the QR code detected by scanning device 230 (step 618). In some embodiments, the visual representation may be a barcode or an access token for accessing a secure computing resource 260.

If the visual representation is verified, the user may be authenticated by security service 250. When the authentication is complete, for example, a user of scanning device 230 may gain access to secure network resource 260.

Various potential use cases of the disclosed embodiments are described below. It is understood that these cases are provided by way of example only and are not limiting of the present disclosure.

One potential implementation may be to facilitate authorization of a user when logging in to a secure website, e.g., a banking website, e-commerce website, or email service. The user may access the website on her mobile device (e.g., smartphone) and attempt to login. The user's mobile device may then send an access request to a computing device or server associated with the website. In response to that request, the website computing device (e.g., web server or intermediate proxy server) may request authentication of the user by the user scanning a QR code or other visual representation.

To prevent access to the secure website by an attacker, the website may request a user be authenticated by scanning an encoded representation, e.g., a QR code. For example, if the user is accessing the website from a laptop, the laptop may display a QR code to be scanned by a device of the user, e.g., smartphone, for further user authentication.

The user may open a mobile application on her smartphone or other device and capture an image of the laptop screen using a camera or other I/O component of the device. The user device may analyze the image data, or transmit the raw image data to a remote server for analysis. One or more techniques may be used to analyze the captured image to detect boundaries of the laptop display, identify an encoded visual representation displayed by the laptop, and identify a network address displayed by the laptop.

To prevent an attacker from cloning a QR code and displaying the cloned QR code on a phishing website, the system may be configured to verify that the image captured by the user contains the entire screen of the laptop, verify that the displayed network address is approved for access, and verify the displayed QR code.

If each factor is verified by the mobile application, or by a security service, the user may be authenticated to access the secure website. Otherwise, the user may be prompted to attempt a second image capture of the laptop, or may be denied access to the secure website.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

The disclosed embodiments may be implemented in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials will be developed and the scope of these terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A non-transitory computer readable medium including instructions that, when executed by at least one processor, cause the at least one processor to perform operations for securely verifying encoded visual codes together with network address information, the operations comprising:
    obtaining a first capture of a visual display, the visual display being generated on a display medium;
    applying a display detection technique based on the obtained first capture; determining, based on the display detection technique, whether a boundary of the display medium is identified;
    identifying, within the first capture, an encoded visual representation of a data element and a network address;
    determining, for the first capture, and based on the display detection technique, that the network address is not valid; and
    determining not to validate the encoded visual representation.

2. The non-transitory computer readable medium of claim 1, wherein the operations further comprise:
    determining, for a second capture, and based on the display detection technique, that the boundary of the display medium is not identified; and
    determining to not validate the encoded visual representation.

3. The non-transitory computer readable medium of claim 2, wherein the display detection technique includes an optical time-of-flight technique.

4. The non-transitory computer readable medium of claim 2, wherein the display detection technique includes an optical depth-detection technique.

5. The non-transitory computer readable medium of claim 2, wherein the display detection technique includes comparing gyroscope-based orientation data with optically-captured orientation data associated with the obtained first capture.

6. The non-transitory computer readable medium of claim 2, wherein the display detection technique includes a two-dimensional image analysis.

7. The non-transitory computer readable medium of claim 2, wherein determining whether the network address is valid includes referencing a list of approved network addresses.

8. The non-transitory computer readable medium of claim 7, wherein the operations further comprise periodically updating the list of approved network addresses.

9. The non-transitory computer readable medium of claim 2, wherein determining whether the network address is valid includes verifying a cryptographic signature associated with the network address.

10. A computer-implemented method for securely verifying encoded visual codes together with network address information, the method comprising:
   obtaining a first capture of a visual display, the visual display being generated on a display medium;
   applying a display detection technique based on the obtained first capture;
   determining, based on the display detection technique, whether a boundary of the display medium is identified;
   identifying, within the first capture, an encoded visual representation of a data element and a network address;
   determining, for the first capture, and based on the display detection technique, that the network address is not valid; and
   determining not to validate the encoded visual representation.

11. The computer-implemented method of claim 10, wherein the method is performed in response to a request by an identity to access a secure computing resource.

12. The computer-implemented method of claim 11, wherein the determining whether the network address is valid includes determining whether the network address is associated with the identity.

13. The computer-implemented method of claim 11, wherein the determining whether the network address is valid includes sending the network address to an external resource for verification.

14. The computer-implemented method of claim 11, wherein the encoded visual representation of the data element is a bar code.

15. The computer-implemented method of claim 11, wherein the data element represented by the encoded visual representation is an access token for accessing a secure computing resource.

16. The computer-implemented method of claim 11, further comprising identifying, within the first capture, a first network address and a second network address.

17. The computer-implemented method of claim 16, further comprising determining whether the first network address and the second network address are each valid.

18. The computer-implemented method of claim 17, further comprising determining not to validate the encoded visual representation if either the first network address or the second network address is not valid.

19. The computer-implemented method of claim 11, further comprising sending a report to a security server when the network address is determined not to be valid.

\* \* \* \* \*